Jan. 12, 1926. 1,569,535
W. P. COLE
SHOCK ABSORBER
Filed August 8, 1922
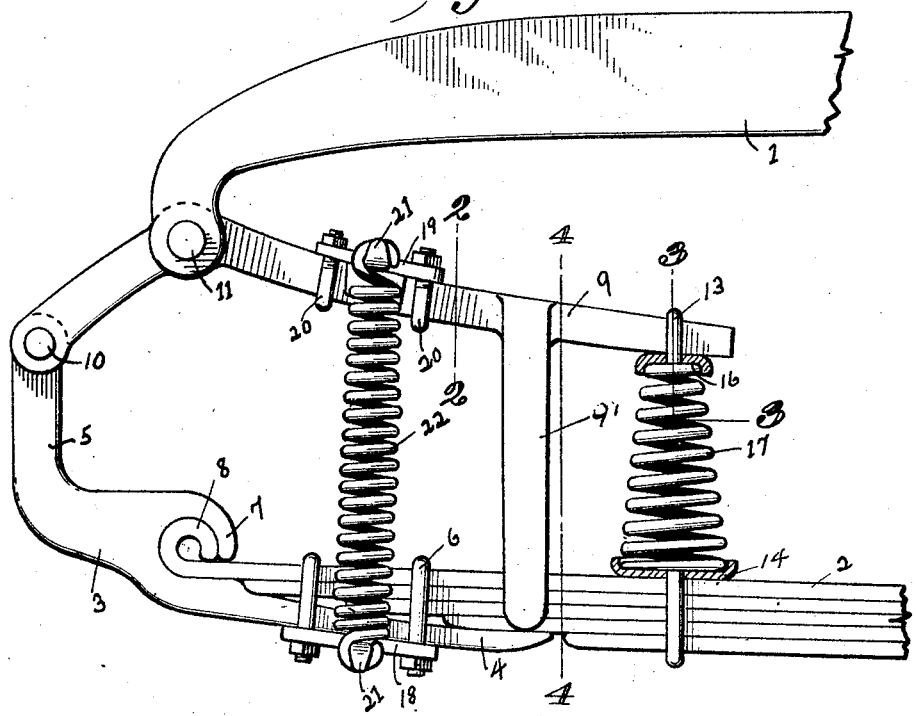
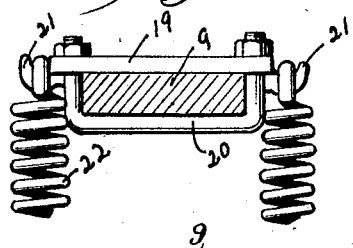
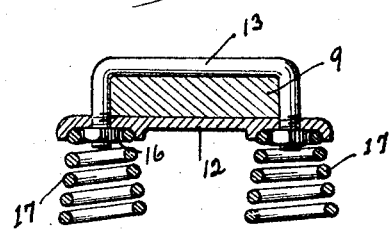
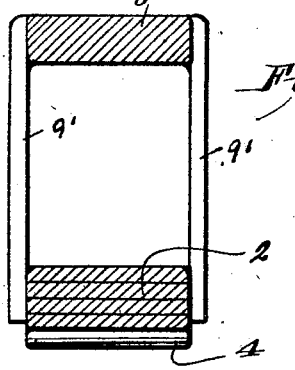
Inventor
William P. Cole Patented Jan. 12, 1926.

1,569,535

UNITED STATES PATENT OFFICE.

WILLIAM P. COLE, OF COALINGA, CALIFORNIA.

SHOCK ABSORBER.

Application filed August 8, 1922. Serial No. 580,413.

*To all whom it may concern:*

Be it known that I, WILLIAM P. COLE, a citizen of the United States, residing at Coalinga, in the county of Fresno and State of California, have invented certain new and useful Improvements in Shock Absorbers, of which the following is a specification.

This invention relates to improved spring attachments for automobiles.

In the present construction of automobile springs and attachments thereto, it has been found that while some of the springs and attachments will absorb all shocks on downward movement of the springs and while others will absorb the shocks on the rebound of the vehicle springs, it has not been possible to develop an attachment that will entirely absorb the shocks of both movements of the vehicle springs.

My invention has been designed to accomplish the above results and at the same time provide a shock absorber that is not only ornamental and adds to the attractiveness of the automobile, but one that is durable, efficient, and one that can be manufactured and installed on an automobile at a relatively low cost.

In order to accomplish the above results without changing the construction of the present type of leaf springs now being used, I have disconnected the main spring from the chassis frame and have secured to this end of the main spring an extension that is in turn pivotally connected with a shock lever to which the chassis frame is connected adjacent one end. The shock lever has two sets of auxiliary springs connected therewith, the opposite ends of each of said sets connected with the main spring. One set of the springs receives the downward shock, while the second set of springs receives and holds the rebound.

These and like objects of my invention will be better understood as the description follows and as is specifically pointed out in the appended claims.

Referring to the accompanying drawing which forms a part of this specification, and which clearly illustrates the operation and construction of my improved shock absorber, Figure 1 is an enlarged fragmentary side elevation of a vehicle spring showing my improved shock absorber attached thereto, Figure 2 is a section taken on line 2—2 of Figure 1, Figure 3 is a section taken on line 3—3 of Figure 1, and Figure 4 is a section taken on line 4—4 of Figure 1.

Referring to the accompanying drawing in detail, like characters will be used to designate like parts in the different views.

In the drawing, the numeral 1 indicates the one end of the chassis frame of an automobile, and 2 the main spring which when assembled in the usual manner is connected at its outer end to the chassis frame. My invention comprises an extension 3, one end as indicated by the numeral 4 engaging the underside of the main spring 2, while the opposite end 5 of the extension is formed at right angles to the end 4, the purpose of which will be better understood as the description follows. The end 4 of the extension 3 is secured to the main spring 2 by means of U bolts and fastening nuts 6 and the extension has a hook 7 formed in same intermediate the ends which engages the curved end 8 of one of the leaves in the spring 2, so as to provide additional locking means for the extension and leaf spring 2.

A shock lever 9 is pivotally connected as at 10 to the upwardly extending portion 5 of the extension 3. One end of the chassis frame 1, is pivotally connected to the lever 9 adjacent the pivot end of same as indicated by the numeral 11. The free end of the shock lever assumes a position between the chassis frame 1 and leaf spring 2 and a plate 12 is secured to the shock lever adjacent one end by means of the U bolts and fastening nuts 13. A second plate 14 is supported on the upper face of the main or leaf spring 2 by means of the U bolts and fastening nuts 15. Each of the plates 12 and 14 have their opposite faces provided with recesses 16 for the purpose of positioning between the plates auxiliary shock absorbing coil springs 17.

From the foregoing description of my invention taken in connection with the accompanying drawing, it can be readily seen that the auxiliary coil springs 17 force the shock lever 9 away from the main leaf spring 2 and towards chassis frame 1, and it will also be readily apparent that upon downward movement of the chassis frame that the auxiliary coil springs 17 will receive the shock.

Having thus described my invention in so far as receiving the shock on downward movement of the car body, I will now describe the construction and operation of the means employed for receiving the rebound of the car body. A plate 18 is secured against the underface of the end 4 of the extension 3 by means of the U bolts 6. A second plate 19 is supported on the upper face of the shock lever 9 by means of U bolts and fastening nuts 20. Lips or cross bolts 21 are formed integral of each side of the plates 18 and 19, to which are connected opposite ends of auxiliary contractile coil springs 22, thus it will be seen that the auxiliary springs 22 absorb and hold the body of the automobile on the rebound.

In view of the foregoing description of my invention taken in connection with the accompanying drawing, it is thought that any further explanation as to the construction, operation, and objects of same is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a spring suspension for vehicles including a main leaf spring and a chassis frame, a shock lever being fulcrumed upon the chassis frame and pivotally connected at one end to the main leaf spring, a contractile spring having connection with said shock lever and said main leaf spring, and a compression spring having connection with said lever and the main leaf spring.

2. In combination with a chassis frame and main leaf spring of an automobile, of an extension connected to the end of the main leaf spring for increasing the length thereof, a shock lever pivoted to the extremity of said extension and having the chassis frame pivotally connected thereto, and means connecting said shock lever with the main spring for receiving the shock on the downward movement of the vehicle body and means also connected between the shock lever and the main spring for receiving the rebound on upward movement of the vehicle body.

3. In combination with a chassis frame and main leaf spring of an automobile, of an extension connected to the end of the main leaf spring for increasing the length thereof, a shock lever pivoted to one end of said extension and having said chassis frame pivotally connected thereto, and auxiliary coil springs positioned between the free end of the shock lever and the main leaf spring for receiving the shock on downward movement of the vehicle body.

4. In combination with a chassis frame and main leaf spring of an automobile, of an extension connected to the end of the main leaf spring for increasing the length thereof, a shock lever pivoted to the extremity of said extension, said shock lever having the chassis frame pivotally connected thereto, a set of auxiliary coil springs positioned between the free end of the shock lever and the main leaf spring for receiving the shock on downward movement of the vehicle body, and a second set of auxiliary coil springs positioned between the shock lever and the main leaf spring for receiving the shock on the rebound of the vehicle body.

5. In a spring suspension mechanism including a main leaf spring and a chassis frame, a shock lever fulcrumed to said leaf spring and chassis frame and having its free end disposed between said elements, a contractile spring connected to said lever and the main leaf spring, and a compression spring having connection with shock lever and main leaf spring.

6. In a shock absorbing mechanism including a leaf spring and a chassis frame, an extension connected to one end of said main spring, a shock lever fulcrumed upon the latter, one end of the lever having connection with the main spring extension, the other end of the lever being disposed between the main spring and chassis frame, an auxiliary contractile spring connected to the last mentioned end of the lever and the main spring, and an auxiliary compression spring arranged between the same end of the lever and the main spring.

7. A spring suspension mechanism including a chassis frame and main leaf spring, of a vehicle, an extension plate connected to the main leaf spring, means carried by said plate and embracing the end of the main leaf spring, a shock lever fulcrumed on the chassis frame and having pivotal connection with said plate, an auxiliary contractile spring connected to the lever and the main leaf spring, and a compression spring arranged between the lever and the main leaf spring.

8. In a spring suspension mechanism, a chassis frame, a main leaf spring, a shock lever fulcrumed upon the chassis frame and having an end arranged between the same and the main leaf spring, a plate having bivotal connection with the other end of said lever, a fastening plate for securing the first plate to the main leaf spring, projections carried by opposite edges of the fastening plate, a second fastening plate secured to the lever, and a pair of auxiliary contractile springs having their ends engaged with the projections of the two fastening plates.

In testimony whereof, I have affixed my signature.

WILLIAM P. COLE.